(12) United States Patent
Terzian

(10) Patent No.: US 10,331,122 B2
(45) Date of Patent: Jun. 25, 2019

(54) AUTONOMOUS SELF-DRIVING VEHICLE WITH ADVERTISING PLATFORM

(71) Applicant: Alexander Terzian, Boston, MA (US)

(72) Inventor: Alexander Terzian, Boston, MA (US)

( * ) Notice: Subject to any disclaimer, the term of this patent is extended or adjusted under 35 U.S.C. 154(b) by 34 days.

(21) Appl. No.: 15/613,190

(22) Filed: Jun. 3, 2017

(65) Prior Publication Data

US 2018/0299883 A1    Oct. 18, 2018

Related U.S. Application Data

(60) Provisional application No. 62/484,947, filed on Apr. 13, 2017.

(51) Int. Cl.
| | | |
|---|---|---|
| *G05D 1/00* | (2006.01) | |
| *G06K 9/00* | (2006.01) | |
| *G09F 21/04* | (2006.01) | |
| *G09F 21/08* | (2006.01) | |
| *G05D 1/02* | (2006.01) | |
| *G05D 1/10* | (2006.01) | |
| *G09F 27/00* | (2006.01) | |
| *G08G 1/00* | (2006.01) | |

(52) U.S. Cl.
CPC ......... *G05D 1/0027* (2013.01); *G05D 1/0246* (2013.01); *G05D 1/0287* (2013.01); *G05D 1/101* (2013.01); *G09F 21/048* (2013.01); *G09F 21/08* (2013.01); *G09F 27/00* (2013.01); *B64C 2201/12* (2013.01); *G05D 2201/0212* (2013.01); *G05D 2201/0213* (2013.01); *G08G 1/00* (2013.01)

(58) Field of Classification Search
CPC .... G05D 1/00; G05D 1/0027; G06K 9/00221; G09F 21/04; G09F 21/048
See application file for complete search history.

(56) References Cited

U.S. PATENT DOCUMENTS

| | | | | |
|---|---|---|---|---|
| 2002/0070879 A1* | 6/2002 | Gazit | ...................... | B60R 25/04 340/901 |
| 2016/0357188 A1* | 12/2016 | Ansari | .................. | G05D 1/0212 |
| 2017/0200197 A1* | 7/2017 | Brubaker | .................. | G09F 9/35 |
| 2018/0007414 A1* | 1/2018 | Li | .............................. | G06T 7/70 |
| 2018/0053215 A1* | 2/2018 | e Costa | .............. | G06Q 30/0266 |

* cited by examiner

*Primary Examiner* — Anshul Sood
(74) *Attorney, Agent, or Firm* — Daniel N. Smith

(57) ABSTRACT

A self-driving vehicle with an external advertising platform, such as video display signage, designed to provide on-demand geolocation video ever-changing advertising. The audiences of such advertisements would include those individuals that were in proximity to the self-driving vehicle as it traversed a geographic area. A large fleet of such self-driving vehicles could constantly move between targeted areas, including suburban neighborhoods to reach a maximum audience, without the need of a human operator.

18 Claims, 12 Drawing Sheets

AUTONOMOUS SELF-DRIVING VEHICLE WITH ADVERTISING PLATFORM

CROSS REFERENCE TO RELATED APPLICATION

This application claims the benefit of U.S. Provisional Patent Application No. 62/484,947, filed on Apr. 13, 2017, the contents of which are incorporated herein by reference.

FIELD OF THE INVENTION

This invention relates to a self-driving vehicle with an external advertising platform designed to provide on-demand geolocation advertising.

BACKGROUND OF INVENTION

Advertising and marketing strategies and tactics vary widely in form, scope, and costs for businesses. Formulation and implementation of these strategies and tactics attempt to reach the maximum number of targeted customers, and potential customers, for minimal amount of expenses. Without constant reevaluation and control of advertising and marketing strategies, they can lose effectiveness or costs can spiral out of control.

Traditional advertising outlets, such as billboards, printed media (e.g. newspapers, magazines, direct marketing mailers), radio, and television commercials reach broad untargeted audiences, but they suffer from several problems: 1) it is difficult to limit the views of this advertising to specific targeted individuals or groups of individuals; 2) these types of advertisements are costly to produce; 3) these types of advertisements result in overpayment due to a lack of targeting, resulting in a waster of advertising expenditures; and 4) these types of advertisement are difficult to modify quickly to reach an audience that changes in real time.

Newer forms of advertising strategies and tactics on electronic media such as website advertising, mobile device advertising, social media, and e-mail are much less costly to product, easier to limit to targeted individuals or groups of individuals, and can be modified quickly to reach different audiences in real time. However, these types of media do not reach broad audiences, and often fail to reach customers or potential customers at the edge, or outside of a targeted group.

So, the subject invention is a new tool for advertising that is cheaper to produce, easy to modify in real time based on changing audiences, can be tailored to reach specific individuals or groups of individuals, and can reach broad audiences.

The subject invention is an autonomous self-driving vehicle with an advertising platform, such as large video signage, that can be used to display ever-changing advertisements. The audiences of such advertisements would include those individuals that were in proximity to the vehicle as it traversed a geographic area. A large fleet of such vehicles could constantly move between targeted areas, including suburban neighborhoods to reach a maximum audience, without the need of a human operator.

SUMMARY OF THE INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The subject invention discloses an autonomous vehicle advertising platform comprising: a self-driving road vehicle containing a computing processor comprising executable software, wherein the processor is communicatively coupled with a data storage device, further wherein the computing processor and the executable software monitor and control the driving functions of the self-driving vehicle; a first plurality of sensors for monitoring the surrounding environment to permit the vehicle to navigate, wherein the first plurality of sensors is communicatively coupled with the computing processor and the data storage device; a second plurality of sensors for monitoring internal drive systems of the self-driving road vehicles, wherein the second plurality of sensors is communicatively coupled with the computing processor and the data storage device; a plurality of cameras for taking images and video of the surrounding environment of the self-driving vehicle, wherein the plurality of cameras is communicatively coupled with the computing processor and the data storage device; an external video screen platform for displaying an advertisement, wherein the external video screen is communicatively coupled with the computing processor and the data storage device; a communication circuitry to bi-directionally send and receive data files between a control server and the computing processor, the data storage device, the first plurality of sensors, the second plurality of sensors, the plurality of cameras, and the external video screen platform of the self-driving road vehicle; and wherein the control server comprises executable software that for tracking, monitoring, and controlling the self-driving vehicles and the external video screen platform.

The subject invention also discloses an autonomous vehicle advertising platform comprising: a self-driving road vehicle containing a computing processor comprising executable software, wherein the processor is communicatively coupled with a data storage device, further wherein the computing processor and the executable software monitor and control the driving functions of the self-driving vehicle, including control of internal drive systems that include a motor, a transmission, an acceleration system, a braking system, wheels, a power source, a navigation system, and an obstacle detection and avoidance system; a first plurality of sensors for monitoring the surrounding environment to permit the vehicle to navigate and avoid obstacles, wherein the first plurality of sensors is communicatively coupled with the computing processor and the data storage device; a second plurality of sensors for monitoring and controlling the internal drive systems of the self-driving road vehicles, wherein the second plurality of sensors is communicatively coupled with the computing processor and the data storage device; a plurality of cameras for taking images and video of the surrounding environment of the self-driving vehicle, wherein the plurality of cameras is communicatively coupled with the computing processor and the data storage device; an external video screen platform for displaying an advertisement, wherein the external video screen is communicatively coupled with the computing processor and the data storage device; a communication circuitry to bi-directionally send and receive data files between a control server and the computing processor, the data storage device, the first plurality of sensors, the second plurality of sensors, the plurality of cameras, and the external video screen platform of the self-driving road vehicle; and wherein the control server comprises executable software that for tracking, monitoring, and controlling the self-driving vehicles and the external video screen platform in real-time.

The subject invention discloses a self-driving vehicle with a video advertising platform comprising: a self-driving road vehicle containing a computing processor comprising executable software communicatively coupled with a data storage device; a first plurality of vehicle navigation sensors; a second plurality of internal monitoring sensors; a plurality of cameras for taking images and video of the surrounding environment of the self-driving vehicle; an external video screen; wherein the first plurality of vehicle navigation sensors, the second plurality of internal monitoring sensors, the plurality of cameras, and the external video screen are all communicatively coupled with the computing processor and the data storage device; further wherein the computing processor and the executable software monitor and control internal drive systems and driving functions of the self-driving vehicle through input received from the first plurality of vehicle navigation sensors, the second plurality of internal monitoring sensors, and the plurality of cameras; wherein the external video screen displays videos that are viewable to individuals located outside the self-driving vehicle in at least one direction; a communication circuitry to bi-directionally send and receive data files between a control server and the computing processor, the data storage device, the internal drive systems, the first plurality of sensors, the second plurality of sensors, the plurality of cameras, and the external video screen platform of the self-driving road vehicle; wherein the control server comprises executable software that for tracking, monitoring, and controlling the self-driving vehicle and the videos displayed on the external video screen in real-time; wherein the control server configures the videos displayed on the external video screen platform in real-time based on the real time geographic location of the self-driving vehicle; and wherein the control server configures the videos displayed on the external video screen platform in real-time based on the real time detection of at least one individual outside of and proximate to the self-driving vehicle.

The subject invention discloses a self-driving vehicle with a video advertising platform comprising: a self-driving road vehicle containing a computing processor comprising executable software communicatively coupled with a data storage device; a first plurality of vehicle navigation sensors; a second plurality of internal monitoring sensors; a plurality of cameras for taking images and video of the surrounding environment of the self-driving vehicle; an external video screen; wherein the first plurality of vehicle navigation sensors, the second plurality of internal monitoring sensors, the plurality of cameras, and the external video screen are all communicatively coupled with the computing processor and the data storage device; further wherein the computing processor and the executable software monitor and control internal drive systems and driving functions of the self-driving vehicle through input received from the first plurality of vehicle navigation sensors, the second plurality of internal monitoring sensors, and the plurality of cameras; wherein the external video screen displays videos that are viewable to individuals located outside the self-driving vehicle in at least two directions; a communication circuitry to bi-directionally send and receive data files between a control server and the computing processor, the data storage device, the internal drive systems, the first plurality of sensors, the second plurality of sensors, the plurality of cameras, and the external video screen platform of the self-driving road vehicle; wherein the control server comprises executable software that for tracking, monitoring, and controlling the self-driving vehicle and the videos displayed on the external video screen in real-time; wherein the control server configures the videos displayed on the external video screen platform in real-time based on the real time geographic location of the self-driving vehicle; and wherein the control server configures the videos displayed on the external video screen platform in real-time based on the real time detection of at least two individuals outside of and proximate to the self-driving vehicle.

The subject invention discloses a self-driving vehicle with a video advertising platform comprising: a self-driving road vehicle containing a computing processor comprising executable software communicatively coupled with a data storage device; a first plurality of vehicle navigation sensors; a second plurality of internal monitoring sensors; a plurality of cameras for taking images and video of the surrounding environment of the self-driving vehicle; an external video screen; wherein the first plurality of vehicle navigation sensors, the second plurality of internal monitoring sensors, the plurality of cameras, and the external video screen are all communicatively coupled with the computing processor and the data storage device; further wherein the computing processor and the executable software monitor and control internal drive systems and driving functions of the self-driving vehicle through input received from the first plurality of vehicle navigation sensors, the second plurality of internal monitoring sensors, and the plurality of cameras; wherein the external video screen displays videos that are viewable to individuals located outside the self-driving vehicle in at least three directions; a communication circuitry to bi-directionally send and receive data files between a control server and the computing processor, the data storage device, the internal drive systems, the first plurality of sensors, the second plurality of sensors, the plurality of cameras, and the external video screen platform of the self-driving road vehicle; wherein the control server comprises executable software that for tracking, monitoring, and controlling the self-driving vehicle and the videos displayed on the external video screen in real-time; wherein the control server configures the videos displayed on the external video screen platform in real-time based on the real time geographic location of the self-driving vehicle; and wherein the control server configures the videos displayed on the external video screen platform in real-time based on the real time detection of at least three individuals outside of and proximate to the self-driving vehicle.

The subject invention discloses a self-driving vehicle with a video advertising platform comprising: a self-driving road vehicle containing a computing processor comprising executable software communicatively coupled with a data storage device; a first plurality of vehicle navigation sensors; a second plurality of internal monitoring sensors; a plurality of cameras for taking images and video of the surrounding environment of the self-driving vehicle; an external video screen; wherein the first plurality of vehicle navigation sensors, the second plurality of internal monitoring sensors, the plurality of cameras, and the external video screen are all communicatively coupled with the computing processor and the data storage device; further wherein the computing processor and the executable software monitor and control internal drive systems and driving functions of the self-driving vehicle through input received from the first plurality of vehicle navigation sensors, the second plurality of internal monitoring sensors, and the plurality of cameras; wherein the external video screen displays videos that are viewable to individuals located outside the self-driving vehicle in at least four directions; a communication circuitry to bi-directionally send and receive data files between a control server and the computing processor, the data storage device, the internal drive systems, the first plurality of sensors, the second plurality of sensors, the plurality of cameras, and the external video screen platform of the self-driving road vehicle; wherein the control server comprises executable software that for tracking, monitoring, and controlling the self-driving vehicle and the videos displayed on the external video screen in real-time; wherein the control server configures the videos displayed on the external video screen platform in real-time based on the real time geographic location of the self-driving vehicle; and wherein the control server configures the videos displayed on the external video screen platform in real-time based on the real time detection of at least four individuals outside of and proximate to the self-driving vehicle.

The subject invention discloses a self-driving vehicle with a video advertising platform comprising: a self-driving road vehicle containing a computing processor comprising executable software communicatively coupled with a data storage device; a first plurality of vehicle navigation sensors for monitoring the surrounding environment to permit the vehicle to navigate and avoid obstacles; a second plurality of internal sensors for monitoring and controlling the internal drive systems of the self-driving road vehicles; a plurality of cameras for taking images and video of the surrounding environment of the self-driving vehicle; an external video screen; wherein the first plurality of vehicle navigation sensors, the second plurality of internal monitoring sensors, the plurality of cameras, and the external video screen are all communicatively coupled with the computing processor and the data storage device; further wherein the computing processor and the executable software monitor and control the driving functions of the self-driving vehicle, including control of internal drive systems that include a motor, a transmission, an acceleration system, a braking system, wheels, a power source, a navigation system, and an obstacle detection and avoidance system through input received from the first plurality of vehicle navigation sensors, the second plurality of internal monitoring sensors, and the plurality of cameras; wherein the external video screen displays videos that are viewable to individuals located outside the self-driving vehicle in at least one direction; a communication circuitry to bi-directionally send and receive data files between a control server and the computing processor, the data storage device, the internal drive systems, the first plurality of sensors, the second plurality of sensors, the plurality of cameras, and the external video screen platform of the self-driving road vehicle; wherein the control server comprises executable software that for tracking, monitoring, and controlling the self-driving vehicle and the videos displayed on the external video screen in real-time; wherein the control server configures the videos displayed on the external video screen platform in real-time based on the real time geographic location of the self-driving vehicle; and wherein the control server configures the videos displayed on the external video screen platform in real-time based on the real time detection of at least one individual outside of and proximate to the self-driving vehicle.

The subject invention discloses a self-driving vehicle with a video advertising platform comprising: a self-driving road vehicle containing a computing processor comprising executable software communicatively coupled with a data storage device; a first plurality of vehicle navigation sensors for monitoring the surrounding environment to permit the vehicle to navigate and avoid obstacles; a second plurality of internal sensors for monitoring and controlling the internal drive systems of the self-driving road vehicles; a plurality of cameras for taking images and video of the surrounding environment of the self-driving vehicle; an external video screen; wherein the first plurality of vehicle navigation sensors, the second plurality of internal monitoring sensors, the plurality of cameras, and the external video screen are all communicatively coupled with the computing processor and the data storage device; further wherein the computing processor and the executable software monitor and control the driving functions of the self-driving vehicle, including control of internal drive systems that include a motor, a transmission, an acceleration system, a braking system, wheels, a power source, a navigation system, and an obstacle detection and avoidance system through input received from the first plurality of vehicle navigation sensors, the second plurality of internal monitoring sensors, and the plurality of cameras; wherein the external video screen displays videos that are viewable to individuals located outside the self-driving vehicle in at least two directions; a communication circuitry to bi-directionally send and receive data files between a control server and the computing processor, the data storage device, the internal drive systems, the first plurality of sensors, the second plurality of sensors, the plurality of cameras, and the external video screen platform of the self-driving road vehicle; wherein the control server comprises executable software that for tracking, monitoring, and controlling the self-driving vehicle and the videos displayed on the external video screen in real-time; wherein the control server configures the videos displayed on the external video screen platform in real-time based on the real time geographic location of the self-driving vehicle; and wherein the control server configures the videos displayed on the external video screen platform in real-time based on the real time detection of at least two individuals outside of and proximate to the self-driving vehicle.

The subject invention discloses a self-driving vehicle with a video advertising platform comprising: a self-driving road vehicle containing a computing processor comprising executable software communicatively coupled with a data storage device; a first plurality of vehicle navigation sensors for monitoring the surrounding environment to permit the vehicle to navigate and avoid obstacles; a second plurality of internal sensors for monitoring and controlling the internal drive systems of the self-driving road vehicles; a plurality of cameras for taking images and video of the surrounding environment of the self-driving vehicle; an external video screen; wherein the first plurality of vehicle navigation sensors, the second plurality of internal monitoring sensors, the plurality of cameras, and the external video screen are all communicatively coupled with the computing processor and the data storage device; further wherein the computing processor and the executable software monitor and control the driving functions of the self-driving vehicle, including control of internal drive systems that include a motor, a transmission, an acceleration system, a braking system, wheels, a power source, a navigation system, and an obstacle detection and avoidance system through input received from the first plurality of vehicle navigation sensors, the second plurality of internal monitoring sensors, and the plurality of cameras; wherein the external video screen displays videos that are viewable to individuals located outside the self-driving vehicle in at least three directions; a communication circuitry to bi-directionally send and receive data files between a control server and the computing processor, the data storage device, the internal drive systems, the first plurality of sensors, the second plurality of sensors, the plurality of cameras, and the external video screen platform of the self-driving road vehicle; wherein the control server comprises executable software that for tracking, monitoring, and controlling the self-driving vehicle and the videos displayed on the external video screen in real-time; wherein the control server configures the videos displayed on the external video screen platform in real-time based on the real time geographic location of the self-driving vehicle; and wherein the control server configures the videos displayed on the external video screen platform in real-time based on the real time detection of at least three individuals outside of and proximate to the self-driving vehicle.

The subject invention discloses a self-driving vehicle with a video advertising platform comprising: a self-driving road vehicle containing a computing processor comprising executable software communicatively coupled with a data storage device; a first plurality of vehicle navigation sensors for monitoring the surrounding environment to permit the vehicle to navigate and avoid obstacles; a second plurality of internal sensors for monitoring and controlling the internal drive systems of the self-driving road vehicles; a plurality of cameras for taking images and video of the surrounding environment of the self-driving vehicle; an external video screen; wherein the first plurality of vehicle navigation sensors, the second plurality of internal monitoring sensors, the plurality of cameras, and the external video screen are all communicatively coupled with the computing processor and the data storage device; further wherein the computing processor and the executable software monitor and control the driving functions of the self-driving vehicle, including control of internal drive systems that include a motor, a transmission, an acceleration system, a braking system, wheels, a power source, a navigation system, and an obstacle detection and avoidance system through input received from the first plurality of vehicle navigation sensors, the second plurality of internal monitoring sensors, and the plurality of cameras; wherein the external video screen displays videos that are viewable to individuals located outside the self-driving vehicle in at least four directions; a communication circuitry to bi-directionally send and receive data files between a control server and the computing processor, the data storage device, the internal drive systems, the first plurality of sensors, the second plurality of sensors, the plurality of cameras, and the external video screen platform of the self-driving road vehicle; wherein the control server comprises executable software that for tracking, monitoring, and controlling the self-driving vehicle and the videos displayed on the external video screen in real-time; wherein the control server configures the videos displayed on the external video screen platform in real-time based on the real time geographic location of the self-driving vehicle; and wherein the control server configures the videos displayed on the external video screen platform in real-time based on the real time detection of at least four individuals outside of and proximate to the self-driving vehicle.

The subject invention discloses a self-flying aerial drone with a video advertising platform comprising: a self-flying aerial drone containing a computing processor comprising executable software communicatively coupled with a data storage device; a first plurality of aerial drone navigation sensors; a second plurality of internal monitoring sensors; a plurality of cameras for taking images and video of the surrounding environment of self-flying aerial drone; an external video screen; wherein the first plurality of aerial drone navigation sensors, the second plurality of internal monitoring sensors, the plurality of cameras, and the external video screen are all communicatively coupled with the computing processor and the data storage device; further wherein the computing processor and the executable software monitor and control internal flying systems and flying functions of the self-flying aerial drone through input received from the first plurality of aerial drone navigation sensors, the second plurality of internal monitoring sensors, and the plurality of cameras; wherein the external video screen displays videos that are viewable to individuals located outside the self-flying aerial drone in at least one to four directions; a communication circuitry to bi-directionally send and receive data files between a control server and the computing processor, the data storage device, the internal flying systems, the first plurality of sensors, the second plurality of sensors, the plurality of cameras, and the external video screen platform of the self-flying aerial drone; wherein the control server comprises executable software that for tracking, monitoring, and controlling the self-flying aerial drone and the videos displayed on the external video screen in real-time; wherein the control server configures the videos displayed on the external video screen platform in real-time based on the real time geographic location of the self-flying aerial drone; and wherein the control server configures the videos displayed on the external video screen platform in real-time based on the real time detection of at least one to four individuals outside of and proximate to the self-flying aerial drone.

The subject invention discloses a self-flying aerial drone with a video advertising platform comprising: a self-flying aerial drone containing a computing processor comprising executable software communicatively coupled with a data storage device; a first plurality of aerial drone navigation sensors for monitoring the surrounding environment to permit the drone to navigate and avoid obstacles; a second plurality of internal sensors for monitoring and controlling the internal flying systems of the self-flying aerial drone; a plurality of cameras for taking images and video of the surrounding environment of the self-flying aerial drone; an external video screen; wherein the first plurality of drone navigation sensors, the second plurality of internal monitoring sensors, the plurality of cameras, and the external video screen are all communicatively coupled with the computing processor and the data storage device; further wherein the computing processor and the executable software monitor and control the flying functions of the self-flying aerial drone, including control of internal flying systems that include a motor, an acceleration system, a landing system, wheels, a power source, a navigation system, and an obstacle detection and avoidance system through input received from the first plurality of aerial drone navigation sensors, the second plurality of internal monitoring sensors, and the plurality of cameras; wherein the external video screen displays videos that are viewable to individuals located outside the self-flying aerial drone in at least one to four directions; a communication circuitry to bi-directionally send and receive data files between a control server and the computing processor, the data storage device, the internal flying systems, the first plurality of sensors, the second plurality of sensors, the plurality of cameras, and the external video screen platform of the self-flying aerial drone; wherein the control server comprises executable software that for tracking, monitoring, and controlling the self-flying aerial drone and the videos displayed on the external video screen in real-time; wherein the control server configures the videos displayed on the external video screen platform in real-time based on the real time geographic location of the self-flying aerial drone; and wherein the control server configures the videos displayed on the external video screen platform in real-time based on the real time detection of at least one individual outside of and proximate to the self-flying aerial drone.

The subject invention discloses a self-navigating watercraft with a video advertising platform comprising: a self-navigating watercraft containing a computing processor comprising executable software communicatively coupled with a data storage device; a first plurality of watercraft navigation sensors; a second plurality of internal monitoring sensors; a plurality of cameras for taking images and video of the surrounding environment of the self-navigating watercraft; an external video screen; wherein the first plurality of watercraft navigation sensors, the second plurality of internal monitoring sensors, the plurality of cameras, and the external video screen are all communicatively coupled with the computing processor and the data storage device; further wherein the computing processor and the executable software monitor and control internal water navigations systems of the self-navigating watercraft through input received from the first plurality of watercraft navigation sensors, the second plurality of internal monitoring sensors, and the plurality of cameras; wherein the external video screen displays videos that are viewable to individuals located outside the self-navigating watercraft in at least one to four directions; a communication circuitry to bi-directionally send and receive data files between a control server and the computing processor, the data storage device, the internal navigation systems, the first plurality of sensors, the second plurality of sensors, the plurality of cameras, and the external video screen platform of the self-navigating watercraft; wherein the control server comprises executable software that for tracking, monitoring, and controlling the self-flying aerial drone and the videos displayed on the external video screen in real-time; wherein the control server configures the videos displayed on the external video screen platform in real-time based on the real time geographic location of the self-navigating watercraft; and wherein the control server configures the videos displayed on the external video screen platform in real-time based on the real time detection of at least one to four individuals outside of and proximate to the self-navigating watercraft.

A method to display real-time, geo-tracked video advertising on self-driving road vehicles; the method comprising: transmitting destination instructions to at least one destination in real-time to a self-driving road vehicle from a control server, wherein the self-driving vehicle is operative to receive the driving instructions in a communication circuitry coupled to a computer processor comprising executable software; operating an internal drive system, a first plurality of vehicle navigation sensors, and a second plurality of internal monitoring sensors; autonomously driving the self-driving road vehicle toward the destination based on the destination information; activating a plurality of cameras on the self-driving vehicle to take a plurality of images and video of the surrounding environment of the self-driving vehicle; activating a video screen externally attached on the self-driving vehicle; displaying videos on the video screen to individuals located outside the self-driving vehicle in at least one direction as the vehicle autonomously drives; tracking the real-time geo-position of the self-driving road vehicle; altering the displayed videos in real-time based on real-time geo-position of the self-driving vehicle; tracking individuals outside and proximate to the self-driving vehicle in real-time; and altering the displayed videos in real-time based on real-time tracking of individuals outside and proximate to the self-driving vehicle.

A method to display real-time, geo-tracked video advertising on self-flying aerial drones; the method comprising: transmitting destination instructions to at least one destination in real-time to a self-flying aerial drone from a control server, wherein the self-flying aerial drone is operative to receive the flying instructions in a communication circuitry coupled to a computer processor comprising executable software; operating an internal flying system, a first plurality of drone navigation sensors, and a second plurality of internal monitoring sensors; autonomously flying the self-flying aerial drone toward the destination based on the destination information; activating a plurality of cameras on the self-flying aerial drone to take a plurality of images and video of the surrounding environment of the self-flying aerial drone; activating a video screen externally attached on the self-flying aerial drone; displaying videos on the video screen to individuals located outside self-flying aerial drone in at least one direction as the vehicle autonomously flys; tracking the real-time geo-position of the self-flying aerial drone; altering the displayed videos in real-time based on real-time geo-position of the self-flying aerial drone; tracking individuals outside and proximate to the self-flying aerial drone in real-time; and altering the displayed videos in real-time based on real-time tracking of individuals outside and proximate to the self-flying aerial drone.

A method to display real-time, geo-tracked video advertising on self-navigating watercraft; the method comprising; transmitting destination instructions to at least one destination in real-time to a self-navigating watercraft from a control server, wherein the self-navigating watercraft is operative to receive the navigating instructions in a communication circuitry coupled to a computer processor comprising executable software; operating an internal navigating system, a first plurality of watercraft navigation sensors, and a second plurality of internal monitoring sensors; autonomously navigating the self-navigating watercraft toward the destination based on the destination information; activating a plurality of cameras on the self-navigating watercraft to take a plurality of images and video of the surrounding environment of the self-navigating watercraft; activating a video screen externally attached on the self-navigating watercraft; displaying videos on the video screen to individuals located outside self-navigating watercraft in at least one direction as the vehicle autonomously navigates; tracking the real-time geo-position of the self-navigating watercraft; altering the displayed videos in real-time based on real-time geo-position of the self-navigating watercraft; tracking individuals outside and proximate to the self-navigating watercraft in real-time; and altering the displayed videos in real-time based on real-time tracking of individuals outside and proximate to the self-navigating watercraft.

In further embodiments of the subject invention, the control server monitors the location and displayed advertisements on the external video screen platform in real-time.

A method to display real-time, geo-tracked video advertising on a plurality of self-driving road vehicles; the method comprising: transmitting destination instructions to a plurality of destinations in real-time to a plurality of self-driving road vehicles from a control server, wherein the self-driving vehicles are operative to receive the driving instructions in a communication circuitry coupled to a computer processor comprising executable software; operating an internal drive system, a first plurality of vehicle navigation sensors, and a second plurality of internal monitoring sensors on each self-driving road vehicle; autonomously driving the plurality of self-driving road vehicles toward the destinations based on the destination information; activating a plurality of cameras on each self-driving vehicle to take a plurality of images and video of the surrounding environment of each self-driving vehicle; activating a video screen externally attached on each self-driving vehicle; displaying videos on each video screen to individuals located outside each self-driving vehicle in at least one direction as the vehicles autonomously drive; tracking the real-time geo-position of each self-driving road vehicle; altering the displayed videos in real-time based on real-time geo-position of each self-driving vehicle; tracking individuals outside and proximate to each self-driving vehicle in real-time; and altering the displayed videos in real-time based on real-time tracking of individuals outside and proximate to each self-driving vehicle.

A method to display real-time, geo-tracked video advertising on a plurality of self-flying aerial drones; the method comprising; transmitting destination instructions to a plurality of destinations in real-time to a plurality of self-flying aerial drones from a control server, wherein the self-flying aerial drones are operative to receive the flying instructions in a communication circuitry coupled to a computer processor comprising executable software; operating an internal fly system, a first plurality of vehicle navigation sensors, and a second plurality of internal monitoring sensors on each self-flying aerial drone; autonomously flying the plurality of self-flying aerial drones toward the destinations based on the destination information; activating a plurality of cameras on each self-flying aerial drone to take a plurality of images and video of the surrounding environment of each self-flying aerial drone; activating a video screen externally attached on each self-flying aerial drone; displaying videos on each video screen to individuals located outside each self-flying aerial drone in at least one direction as the drones autonomously fly; tracking the real-time geo-position of each self-flying aerial drone; altering the displayed videos in real-time based on real-time geo-position of each self-flying aerial drone; tracking individuals outside and proximate to each self-flying aerial drone in real-time; and altering the displayed videos in real-time based on real-time tracking of individuals outside and proximate to each self-flying aerial drone.

In additional embodiments of the subject invention, control server monitors and controls a plurality of self-driving road vehicle, aerial drone, or watercraft in separate geographic locations.

In other embodiments of the subject invention, the control server software can configure the advertising displayed on the external video screen platform in real-time based on the geographic location of the self-driving vehicle, aerial drone, or water craft.

In embodiments of the subject invention, the control server software can configure the advertising displayed on the external video screen platform in real-time based on the time.

In additional embodiments of the subject invention, the control server software can analysis and configure the advertising displayed on the external video screen platform in real-time to generate optimal routes for the advertising campaign.

In further embodiments of the subject invention, the self-driving vehicle can be any land wheeled vehicle.

In other embodiments of the subject invention, the self-driving vehicle can be an aerial drone.

In further embodiments of the subject invention, the self-driving vehicle can be a land wheeled vehicle selected from the group consisting of: carts, all-terrain vehicles, cars, trucks, platform trucks, flatbed trucks, semi-trailer trucks, buses, minivans, cargo vans, panel vans, utility vehicle, sport utility vehicle, golf cart, bus, minibus, ambulance, school bus, delivery truck, motor home, shuttle bus, fire truck, flatbed truck, trailer, fifth wheel trailer, caravan, armored truck, dump truck, garbage truck and a tractor.

In other embodiments of the subject invention, the self-driving vehicle can be a water vessel, selected from the group consisting of: boats, yachts, ships, Jet-skis®, or other personal watercraft.

In other embodiments of the subject invention, the plurality of cameras comprise facial recognition software to analyze captures images of individuals in close proximity to the self-driving vehicle to estimate the audience for a displayed advertisement.

In further embodiments of the subject invention, the plurality of cameras comprise facial recognition software to analyze captures images of individuals in close proximity to the self-driving vehicle to alter displayed advertisements on the external video screen platform in real time.

In embodiments of the subject invention, the terms "substantial" or "substantially" are defined as at least close to (and can include) a given value or state, as understood by a person of ordinary skill in the art. In one embodiment, the terms "substantial" or "substantially" refers to ranges within 10%, preferably within 5%, more preferably within 1%, and most preferably within 0.1% of the given value or state being specified.

There are additional features of the invention that will be described hereinafter and which will form the subject matter of the claims appended hereto. These together with other objects of the invention, along with the various features of novelty, which characterize the invention, are pointed out with particularity in the claims annexed to and forming a part of this disclosure.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE EMBODIMENTS

While several variations of the present invention have been illustrated by way of example in particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

As illustrated in FIGS. 1-11, the subject invention is an autonomous self-driving vehicle 1 with an advertising platform, such as large video signage 2, that can be used to display ever-changing advertisements.

The audiences of such advertisements include those individuals 7 in proximity to the autonomous vehicle 1 as it traverses a geographic area. A large fleet of such vehicles 1 constantly moves on pre-programmed routes between targeted areas, including suburban neighborhoods, to reach a maximum audience, without the need of a human operator.

The invention includes a software program that interfaces with the plurality of self-driving vehicles 1, for monitoring and controlling the vehicles 1 and the advertising platform. The software includes real time tracking of all vehicles 1. The software can configure an advertising campaign for display on the advertising platforms on each vehicle 1 for certain geographic areas, defined times, and frequency of displayed advertisements.

Figure 1:
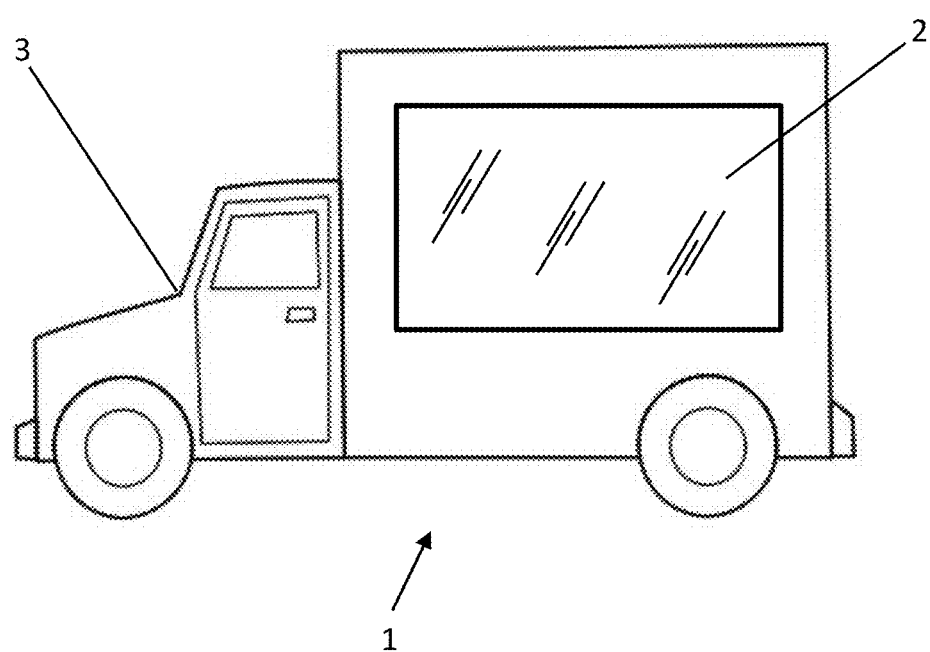
FIG. 1 illustrates one embodiment of a self-driving truck with a video signage advertising platform on the side of the truck.
Figure 2:
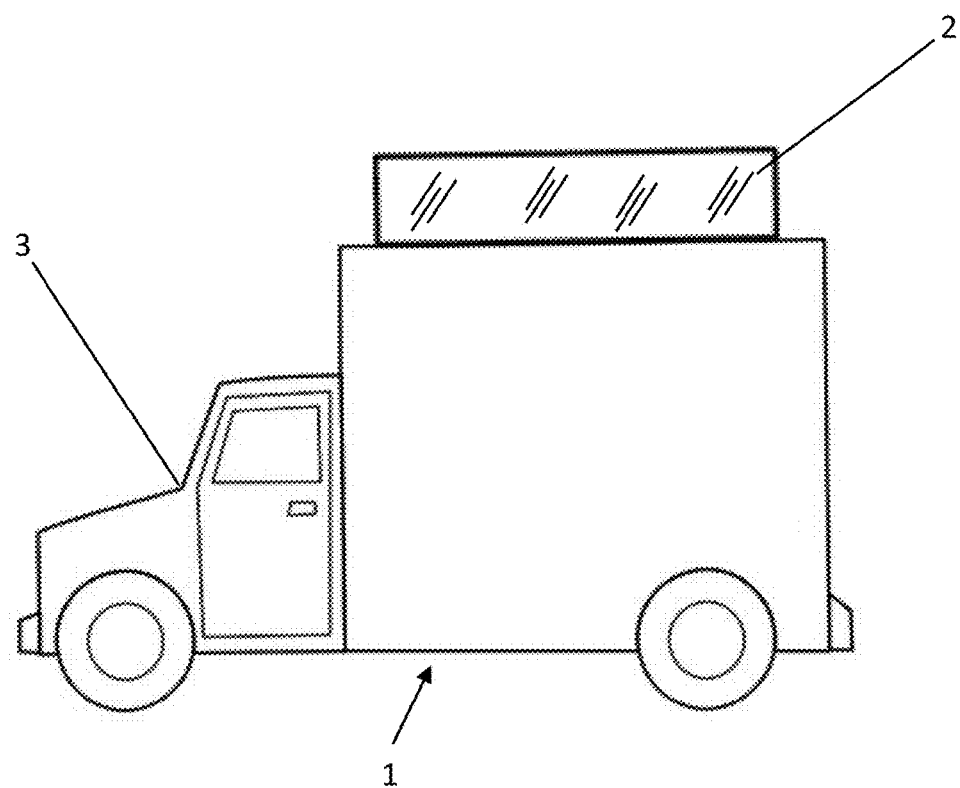
FIG. 2 illustrates another embodiment of a self-driving truck with a video signage advertising platform on the top of the truck.
Figure 3:
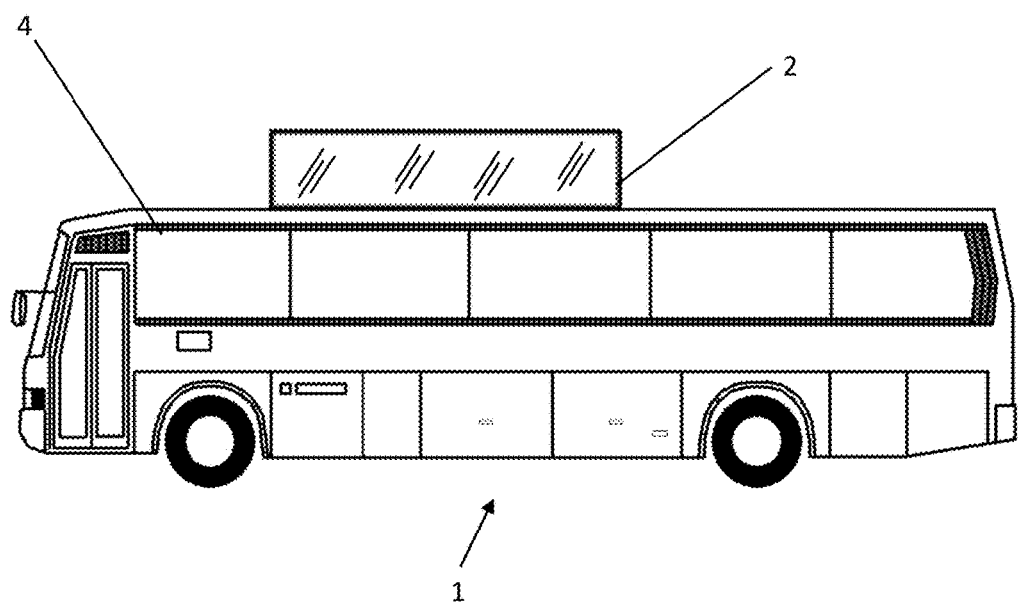
FIG. 3 illustrates one embodiment of a self-driving bus with a video signage advertising platform on the top of the bus.
Figure 4:
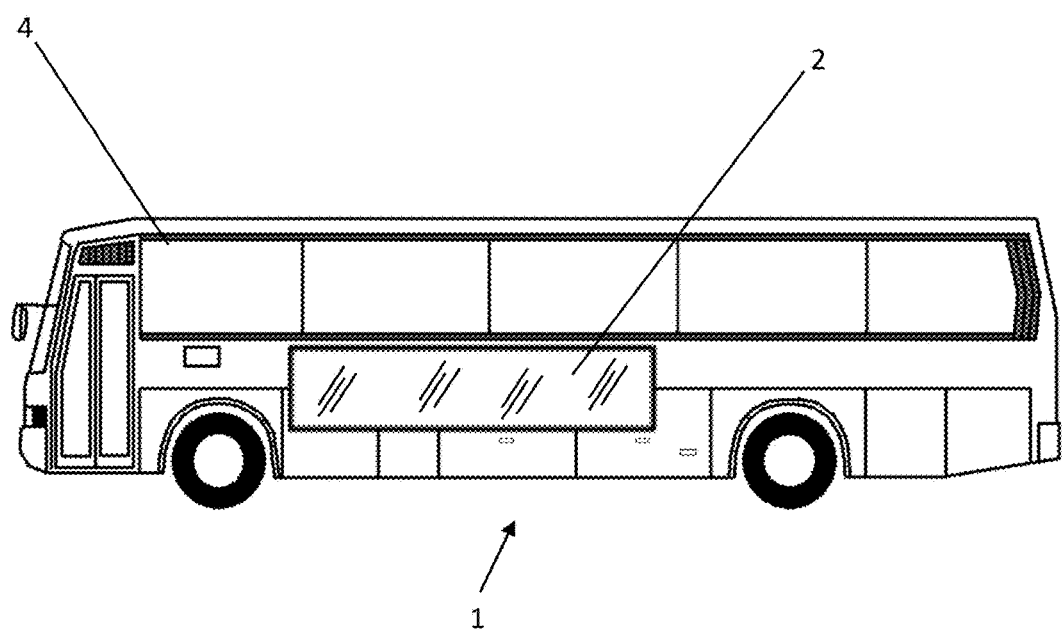
FIG. 4 illustrates another embodiment of a self-driving bus with a video signage advertising platform on the top of the bus.
Figure 5:
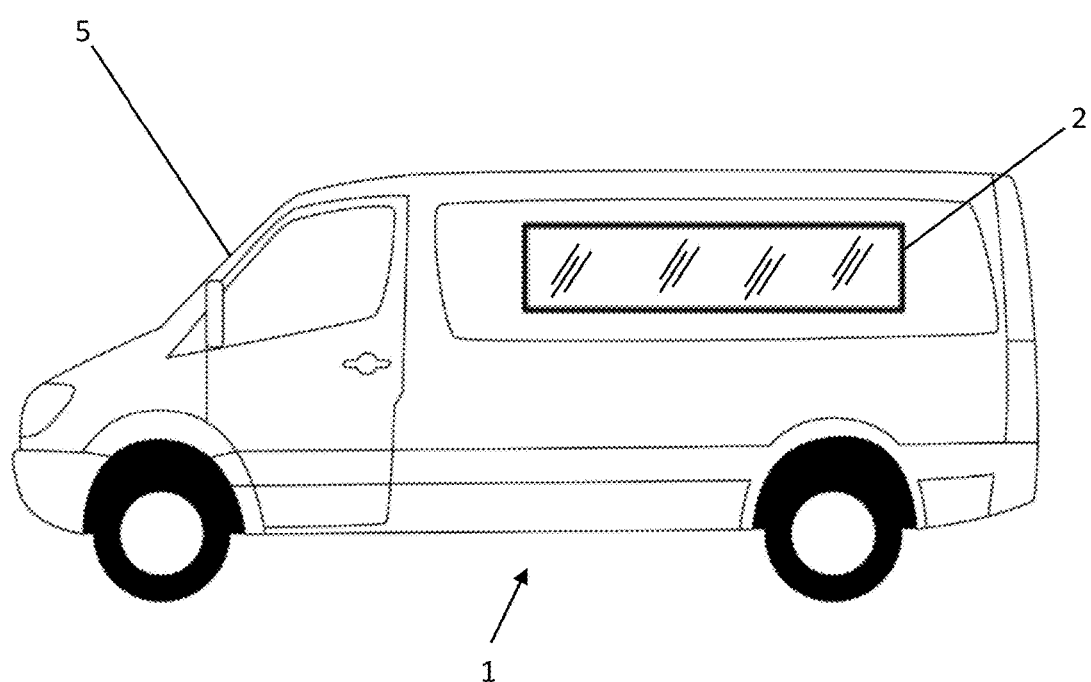
FIG. 5 illustrates one embodiment of a self-driving van with a video signage advertising platform on the side of the van.
Figure 6:
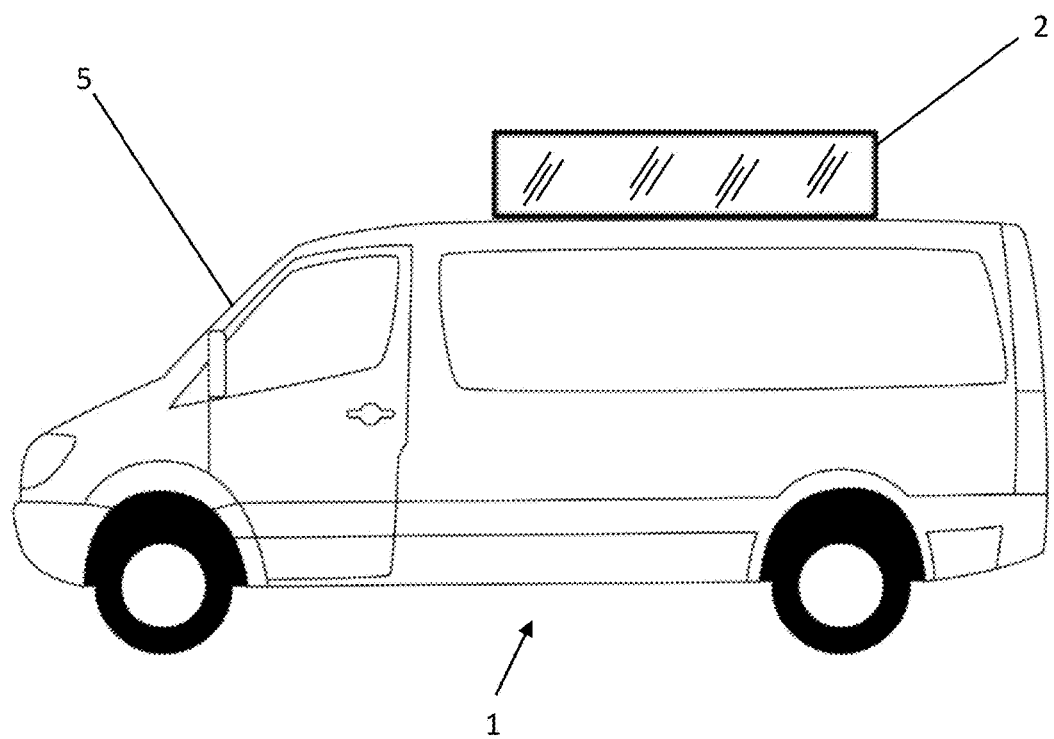
FIG. 6 illustrates another embodiment of a self-driving van with a video signage advertising platform on the side of the van.
Figure 7:
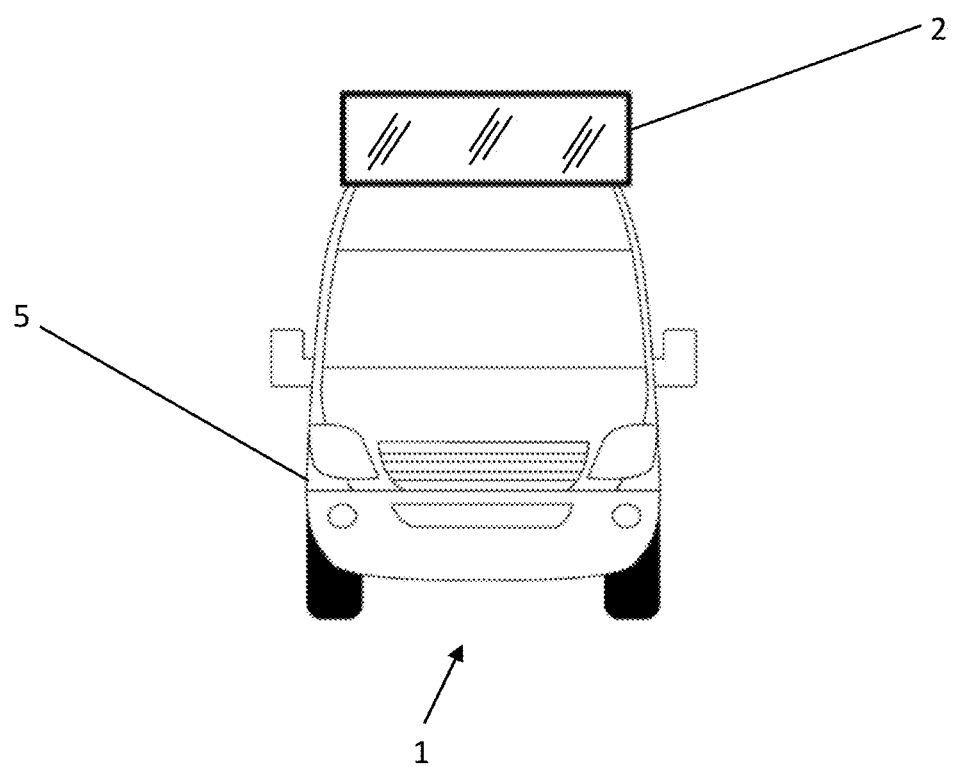
FIG. 7 illustrates another embodiment of a self-driving van with a video signage advertising platform on the top of the van.
Figure 8:
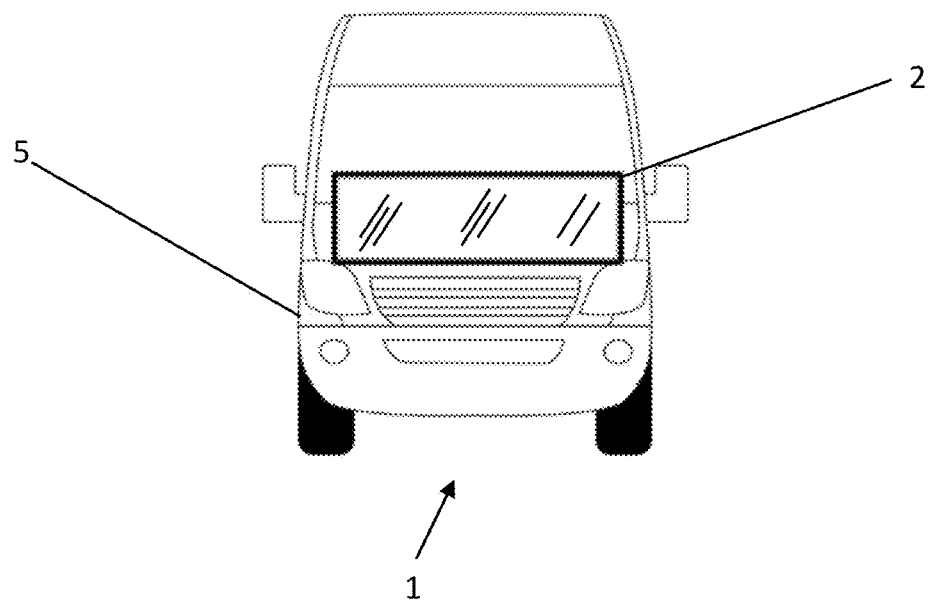
FIG. 8 illustrates another embodiment of a self-driving van with a video signage advertising platform on the front of the van.
Figure 9:
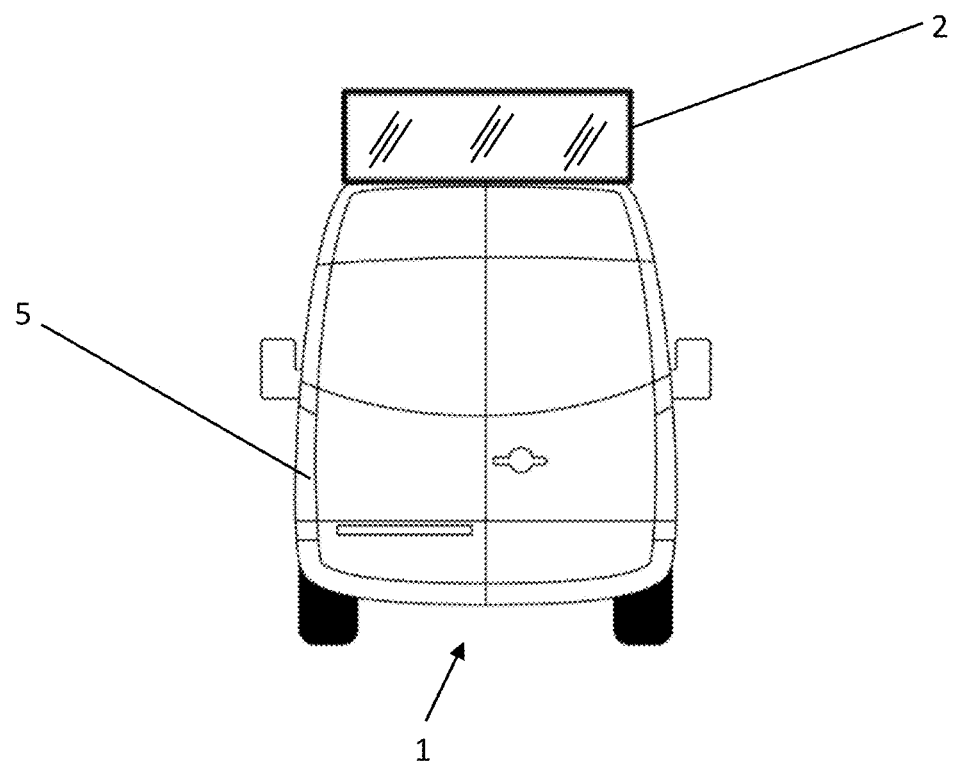
FIG. 9 illustrates another embodiment of a self-driving van with a video signage advertising platform on the top of the van.
Figure 10:
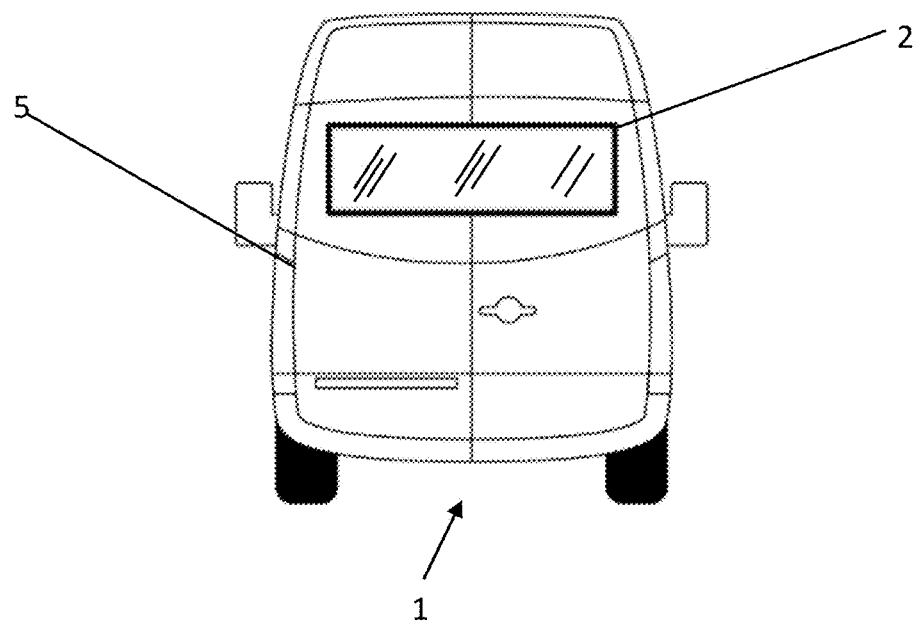
FIG. 10 illustrates another embodiment of a self-driving van with a video signage advertising platform on the rear of the van.
Figure 11:
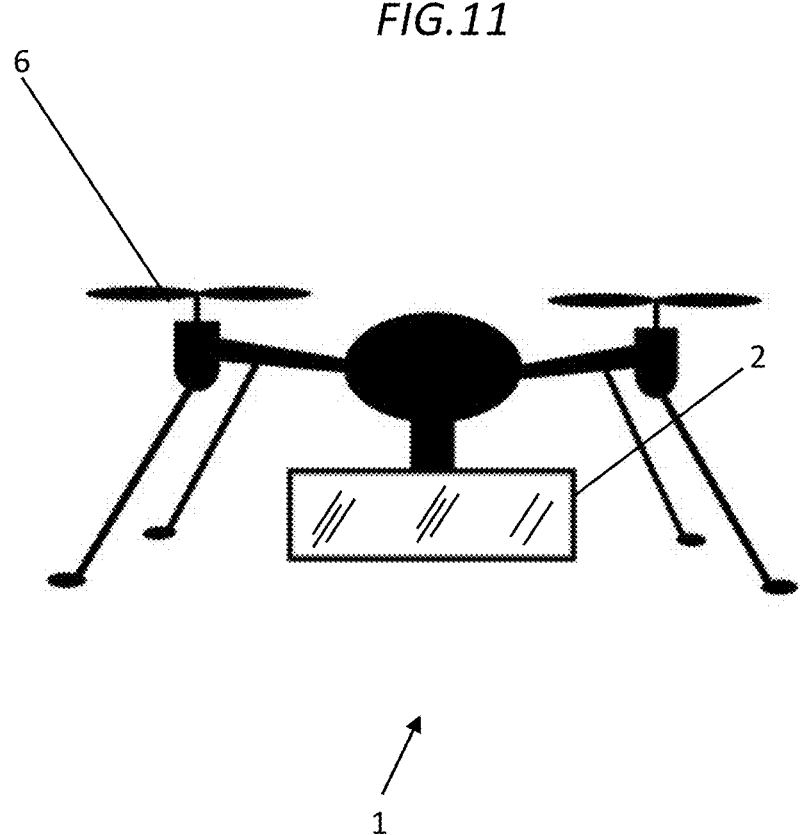
FIG. 11 illustrates an embodiment of a self-driving aerial drone with a video signage advertising platform.
Figure 12:
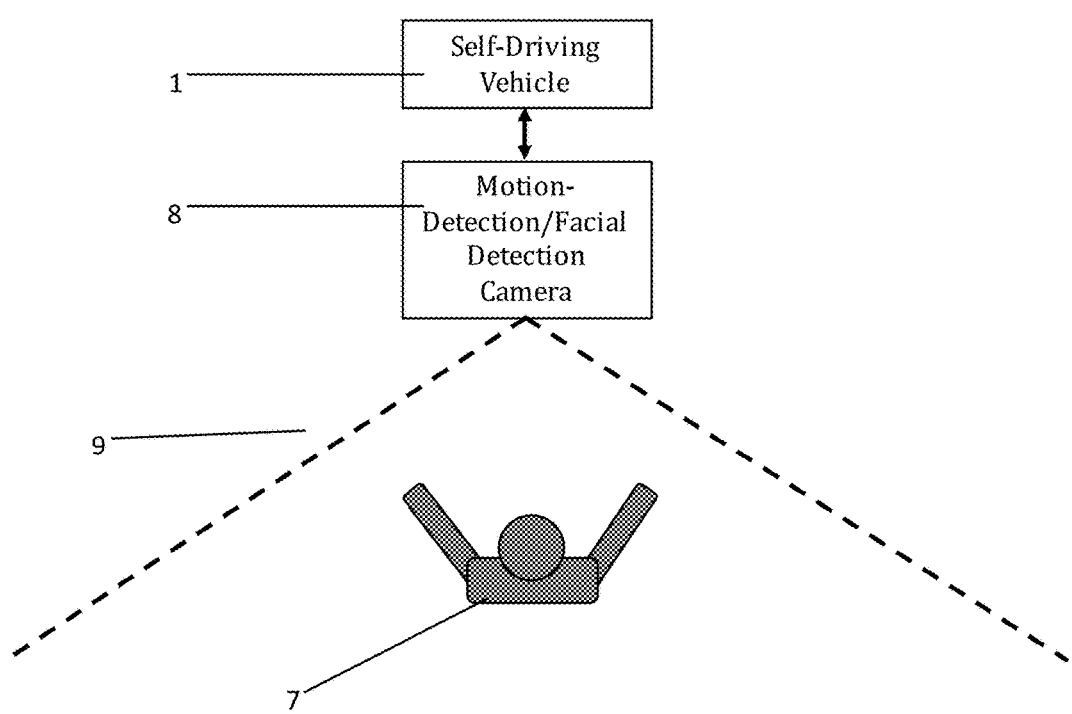
FIG. 12 illustrates an embodiment of a diagram of a self-driving vehicle capturing images of individuals around the vehicle.

In embodiments of the subject invention, the self-driving vehicle 1 can be any land wheeled vehicle or drone, such as a delivery truck 3, illustrated in FIGS. 1 and 2; a city bus 4, as illustrated in FIGS. 3 and 4, a delivery van 5, as illustrated in FIGS. 5-10, or an aerial drone 6, as illustrated in FIG. 11.

In further embodiments of the subject invention, the vehicle 1 contains a plurality of sensors capture and/or analyze the surrounding environment to permit the vehicle 1 to navigate. The environmental sensors may include, but is not limited to: global positioning system (GPS), satellite receivers, wireless transmitters/receivers, radio transmitters/receivers, RADAR systems, infrared sensors, ultrasound sensors, laser distance finders, accelerometers, inertial measurement units, gyroscopes, compasses, motions sensors, and a plurality of cameras. In further embodiments of the subject invention, the vehicle 1 may contain a plurality of sensors to monitor internal systems, including, but not limited to: engine monitors, fuel gauges, oil levels, oil temperature, tire pressure, and external lights.

In additional embodiments of the subject invention, the software program interfaces with the vehicle's computer control system, the plurality of vehicle sensors, and the vehicle advertising platforms via a communications satellite such as a GPS, a geostationary (GEO) satellite, medium earth orbit (MEO) satellite, or low earth orbit (LEO) satellite, or via a terrestrial wireless network. The wireless network can be a cellular network, such as 3G cellular communication, such as CDMA, EVDO, GSM/GPRS, or 4G cellular communication, such as WiMAX or LTE. The wireless network can be a Wi-Fi or other short range radio network, such as or Bluetooth®. The real time location and activity of each self-driving vehicle 1 may be tracked with a Global Navigation Satellite System (GNSS) such as GPS.

In other embodiments of the subject invention, the software platform can collect and analysis the locations, movements, and activity of the self-driving vehicles 1, and analysis the efficiency of advertisements displayed on the video signage 2 to generate optimal routes for certain advertising campaigns. For examples, certain advertisements displayed at certain times, and/or certain locations may product higher customer contact and sales with the advertiser. By analyzing this data, the routes of the vehicles 1 and the video displays 2 can be coordinated to display to broad and targeted audiences.

In further embodiments of the subject invention, the plurality of cameras 8 around the self-driving vehicle 1 may capture 9 a plurality of images of the environment of the vehicle, and people 7 around the vehicle. The camera 8 may take images or video. The cameras 8 may be multidirectional cameras, cameras with a 360 degree view, rotating cameras, or stereo optic cameras. In embodiments of the subject invention, the plurality of cameras 8 are coupled to the vehicle's vision system which analyzes captured images in order to identify objects in the environment of autonomous neighborhood vehicle that could include traffic signals, traffic signs, other vehicles 1, pedestrians, bicycles, animals, road boundaries, and any other obstacles.

In additional embodiments, the plurality of cameras 8 may comprise facial recognition software to analyze captured 9 images of individuals 7 in close proximity to the vehicle 1. Based on the facial recognition, age, gender, the software interface program may alter displayed advertisements in real time. These facial recognition cameras 8 can also be designed to calculate a number of audience exposures to a given advertisement.

In embodiments of the subject invention, the self-driving vehicles 1 may contain adaptive motion sensors to determine movement of and around the vehicle 1.

In further embodiments of the subject invention, the vehicle's propulsion system can be an engine connected to a transmission and wheels. The engine could be any combination of an internal combustion engine, an electric motor, a hybrid electric/gas engine, a steam engine, a solar powered engine, or other types of engines. The energy source for the engine self-driving vehicle includes, but is not limited to: gasoline, diesel, petroleum-based fuels, propane, compressed gas-based fuels, ethanol, solar panels, and batteries.

The software program that interfaces with the plurality of self-driving vehicles 1 may run on multiple host servers; local, regional and national databases residing within the host servers. The host servers would contain means for uploading data from the plurality of self-driving vehicles 1; means for organizing all the uploaded data into the local, regional and national databases; means for running specific search queries from the self-driving vehicles 1 on the databases.

The computer control system of the self-driving vehicles 1 may contain a processor, a memory storage, and control software, all communicatively coupled with the plurality of environmental sensors, internal monitoring sensors, the advertising platform, and the external software program that interfaces with the plurality of self-driving vehicles 1. The computer control system of the self-driving vehicles 1 may also be communicatively coupled with components to control vehicle driving, including, but not limited to: acceleration unit, braking unit, steering unit, a vision system, a temperature control unit, an obstacle avoidance system, and a navigation system.

The host servers and the computer control systems for the vehicles 1 may include communication devices (such as a bus), a CPU/processor, a main operating memory, and a storage memory, both communicatively coupled with the plurality of environmental sensors, internal monitoring sensors, the advertising platform, and the external software program that interfaces with the plurality of self-driving vehicles 1. The host servers and the computer control system of the self-driving vehicles 1 may also be communicatively coupled with components to control vehicle driving, including, but not limited to: acceleration unit, braking unit, steering unit, a vision system, a temperature control unit, an obstacle avoidance system, and a navigation system.

Embodiments of the CPU/processor may include processors, microprocessors, multi-core processors, microcontrollers, system-on-chips, field programmable gate arrays (FPGA), application specific integrated circuits (ASIC), application specific instruction-set processors (ASIP), or graphics processing units (GPU). The host servers and the computer control systems for the vehicles store computer retrievable information and software executable instructions and may include solid state, magnetic, or optical recording mediums. Embodiments of an input terminal of the mobile computing devices may include a keyboard, a mouse, a pen, a microphone combined with voice recognition software, a camera, a multi-point touch screen, a bar code scanner, or a SKU scanner. In embodiments of the subject invention, the underlying architecture of the system may be implemented using one or more computer programs, each of which may execute under the control of an operating system, such as Windows, OS2, DOS, AIX, UNIX, MAC OS, iOS, ChromeOS, Android, and Windows Phone or CE.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

The many aspects and benefits of the invention are apparent from the detailed description, and thus, it is intended for the following claims to cover such aspects and benefits of the invention, which fall within the scope, and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. An autonomous vehicle advertising platform comprising:
   a self-driving vehicle containing a computing processor comprising executable software, wherein the computing processor is communicatively coupled with a data storage device, further wherein the computing processor and the executable software monitor and control a plurality of driving functions of the self-driving vehicle;
   a first plurality of sensors for monitoring a surrounding environment to permit the self-driving vehicle to navigate, wherein the first plurality of sensors is communicatively coupled with the computing processor and the data storage device;
   a second plurality of sensors for monitoring internal drive systems of the self-driving vehicle, wherein the second plurality of sensors is communicatively coupled with the computing processor and the data storage device;
   a plurality of cameras for taking images and video of the surrounding environment of the self-driving vehicle, wherein the plurality of cameras is communicatively coupled with the computing processor and the data storage device;
   an external video screen platform for displaying an advertisement, wherein the external video screen platform is communicatively coupled with the computing processor and the data storage device;
   a communication circuitry to bi-directionally send and receive data files between a control server and the computing processor, the data storage device, the first plurality of sensors, the second plurality of sensors, the plurality of cameras, and the external video screen platform of the self-driving vehicle; and
   wherein the control server comprises executable software for tracking, monitoring, and controlling the self-driving vehicle and the external video screen platform,
   wherein the plurality of cameras comprise facial recognition software to analyze captured images of individuals in close proximity to the self-driving vehicle to alter displayed advertisements on the external video screen platform in real time based on characteristics of the individuals analyzed by the facial recognition software.

2. The autonomous vehicle advertising platform of claim 1, wherein the control server monitors a location and displayed advertisements on the external video screen platform in real-time.

3. The autonomous vehicle advertising platform of claim 1, wherein the control server monitors and controls a plurality of self-driving vehicles in separate geographic locations.

4. The autonomous vehicle advertising platform of claim 1, wherein the control server software configures the advertising displayed on the external video screen platform in real-time based on a geographic location of the self-driving vehicle.

5. The autonomous vehicle advertising platform of claim 1, wherein the control server software configures the advertising displayed on the external video screen platform in real-time based on a time.

6. The autonomous vehicle advertising platform of claim 1, wherein the control server software analyzes and configures the advertising displayed on the external video screen platform in real-time to generate optimal routes for an advertising campaign.

7. The autonomous vehicle advertising platform of claim 1, wherein the self-driving vehicle is a land wheeled vehicle.

8. The autonomous vehicle advertising platform of claim 1, wherein the self-driving vehicle is an aerial drone.

9. The autonomous vehicle advertising platform of claim 1, wherein the self-driving vehicle is a land wheeled vehicle selected from the group consisting of: carts, all-terrain vehicles, cars, trucks, platform trucks, flatbed trucks, semi-trailer trucks, buses, minivans, cargo vans, and panel vans.

10. The autonomous vehicle advertising platform of claim 1, wherein the plurality of cameras comprise facial recognition software to analyze captured images of individuals in close proximity to the self-driving vehicle to estimate an audience for the displayed advertisement.

11. An autonomous vehicle advertising platform comprising:
- a self-driving vehicle containing a computing processor comprising executable software, wherein the computing processor is communicatively coupled with a data storage device, further wherein the computing processor and the executable software monitor and control a plurality of driving functions of the self-driving vehicle, including control of internal drive systems that include a motor, a transmission, an acceleration system, a braking system, wheels, a power source, a navigation system, and an obstacle detection and avoidance system;
- a first plurality of sensors for monitoring a surrounding environment to permit the self-driving vehicle to navigate and avoid obstacles, wherein the first plurality of sensors is communicatively coupled with the computing processor and the data storage device;
- a second plurality of sensors for monitoring and controlling the internal drive systems of the self-driving vehicle, wherein the second plurality of sensors is communicatively coupled with the computing processor and the data storage device;
- a plurality of cameras for taking images and video of the surrounding environment of the self-driving vehicle, wherein the plurality of cameras is communicatively coupled with the computing processor and the data storage device;
- an external video screen platform for displaying an advertisement, wherein the external video screen platform is communicatively coupled with the computing processor and the data storage device;
- a communication circuitry to bi-directionally send and receive data files between a control server and the computing processor, the data storage device, the first plurality of sensors, the second plurality of sensors, the plurality of cameras, and the external video screen platform of the self-driving vehicle; and wherein the control server comprises executable software for tracking, monitoring, and controlling the self-driving vehicle and the external video screen platform in real-time, wherein the plurality of cameras comprise facial recognition software to analyze captured images of individuals in close proximity to the self-driving vehicle to alter displayed advertisements on the external video screen platform in real time based on characteristics of the individuals analyzed by the facial recognition software.

12. The autonomous vehicle advertising platform of claim 11, wherein the control server monitors and controls a plurality of self-driving vehicles in separate geographic locations.

13. The autonomous vehicle advertising platform of claim 11, wherein the control server software configures the advertising displayed on the external video screen platform in real-time based on a geographic location of the self-driving vehicle.

14. The autonomous vehicle advertising platform of claim 11, wherein the control server software analyzes and configures the advertising displayed on the external video screen platform in real-time to generate optimal routes for an advertising campaign.

15. The autonomous vehicle advertising platform of claim 11, wherein the self-driving vehicle is a land wheeled vehicle.

16. The autonomous vehicle advertising platform of claim 11, wherein the self-driving vehicle is an aerial drone.

17. The autonomous vehicle advertising platform of claim 11, wherein the self-driving vehicle is a land wheeled vehicle selected from the group consisting of: carts, all-terrain vehicles, cars, trucks, platform trucks, flatbed trucks, semi-trailer trucks, buses, minivans, cargo vans, and panel vans.

18. The autonomous vehicle advertising platform of claim 11, wherein the plurality of cameras comprise facial recognition software to analyze captured images of individuals in close proximity to the self-driving vehicle to estimate an audience for the displayed advertisement.

* * * * *